United States Patent [19]
Inoue

[11] Patent Number: 5,901,122
[45] Date of Patent: May 4, 1999

[54] FOCUS DRIVE CIRCUIT AND FOCUS SEARCH METHOD BASED ON RELATIVE POSITIONAL RELATIONSHIP BETWEEN DISC AND OBJECTIVE LENS

[75] Inventor: Hiraku Inoue, Kanagawa, Japan

[73] Assignee: Sony Corporation, Tokyo, Japan

[21] Appl. No.: 08/728,706

[22] Filed: Oct. 10, 1996

[30] Foreign Application Priority Data

Oct. 18, 1995 [JP] Japan .................................. 7-293833

[51] Int. Cl.$^6$ ....................................................... G11B 7/09
[52] U.S. Cl. ................................. 369/44.29; 369/44.27
[58] Field of Search ........................... 369/44.27, 44.29, 369/44.35, 44.25, 44.36, 54

[56] References Cited

U.S. PATENT DOCUMENTS

| | | | |
|---|---|---|---|
| 5,010,538 | 4/1991 | Takeda et al. ...................... | 369/44.36 |
| 5,060,215 | 10/1991 | Kawamura et al. ................. | 369/44.35 |
| 5,202,871 | 4/1993 | Yokota ................................. | 369/44.29 |
| 5,379,282 | 1/1995 | Wachi .................................. | 369/44.35 |
| 5,642,340 | 6/1997 | Nomura .............................. | 369/44.25 |

FOREIGN PATENT DOCUMENTS 61-158036  12/1984  Japan .

*Primary Examiner*—Thang V. Tran
*Attorney, Agent, or Firm*—Limbach & Limbach L.L.P.

[57] ABSTRACT

The present invention provides a focus servo circuit which can quickly and surely close the focus servo loop by discriminating fluctuation of initial position for starting the focus search operation generated by thickness of disc, surface deflection of disc and mechanical center position of objective lens or the like and then changing the focus search method depending on the result of discrimination.

11 Claims, 11 Drawing Sheets

F I G. IA
(PRIOR ART)
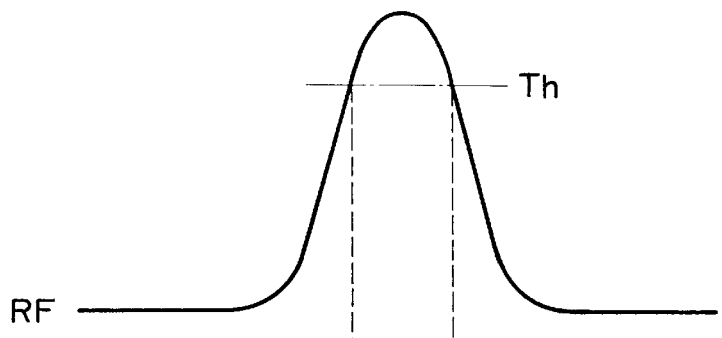
F I G. IB
(PRIOR ART)
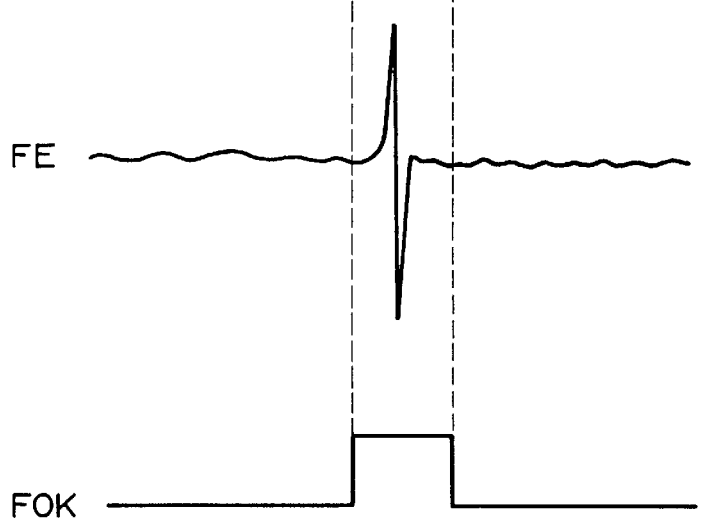
F I G. IC
(PRIOR ART)
F I G. ID
(PRIOR ART)
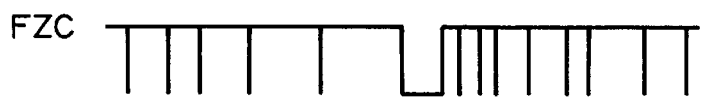

FIG. 2
(PRIOR ART)
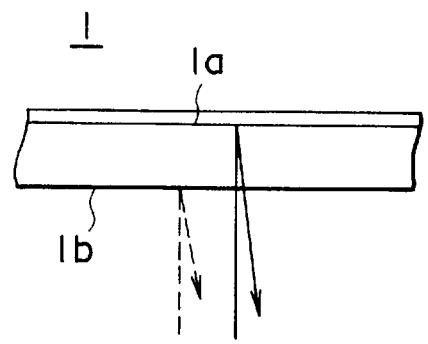
FIG. 3A
(PRIOR ART)
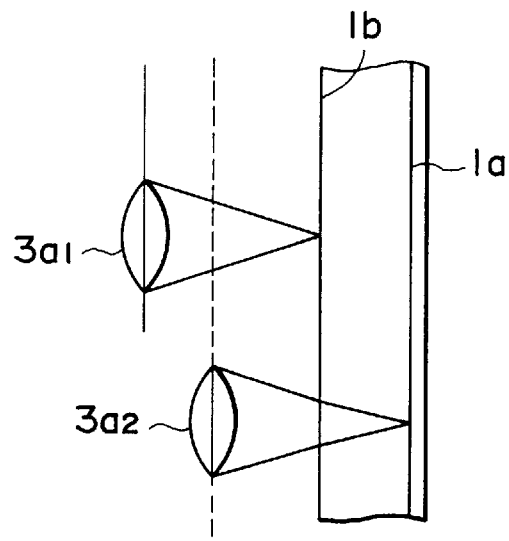
FIG. 3B
(PRIOR ART)
FIG. 3C
(PRIOR ART)
FIG. 3D
(PRIOR ART)
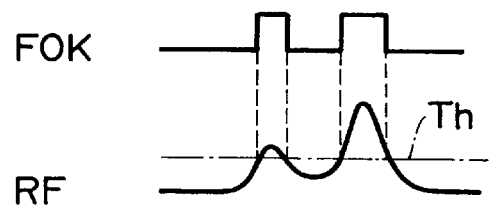
FIG. 3E
(PRIOR ART)

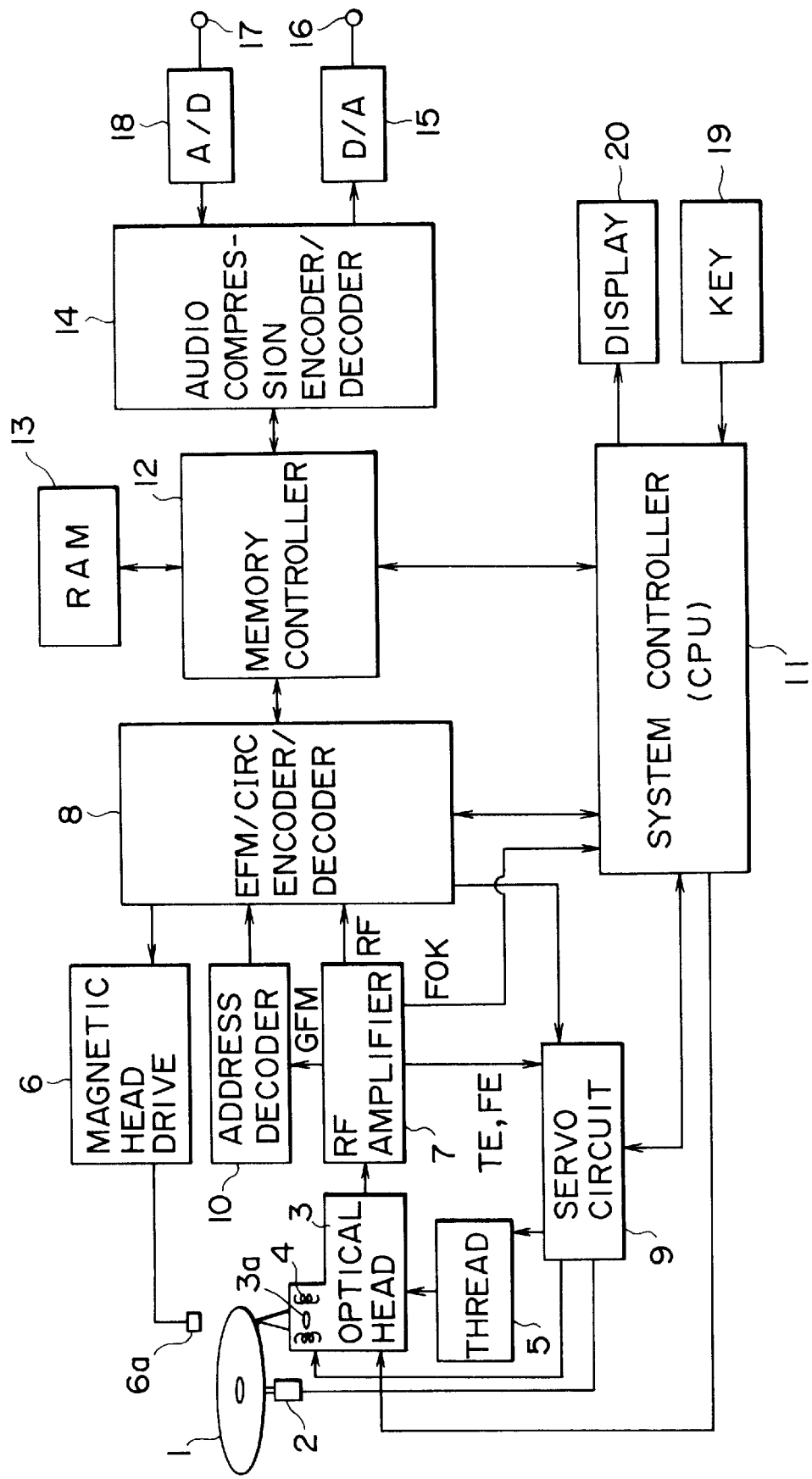
F I G. 4

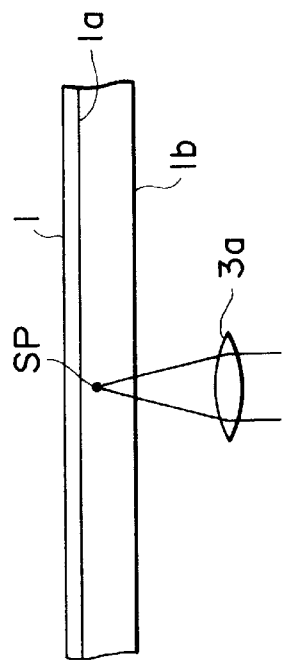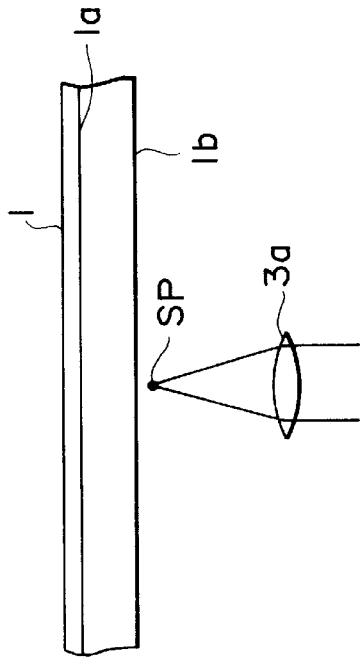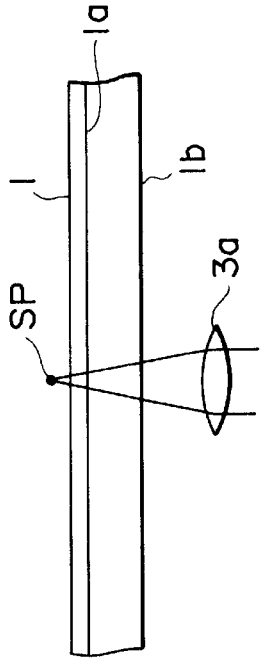

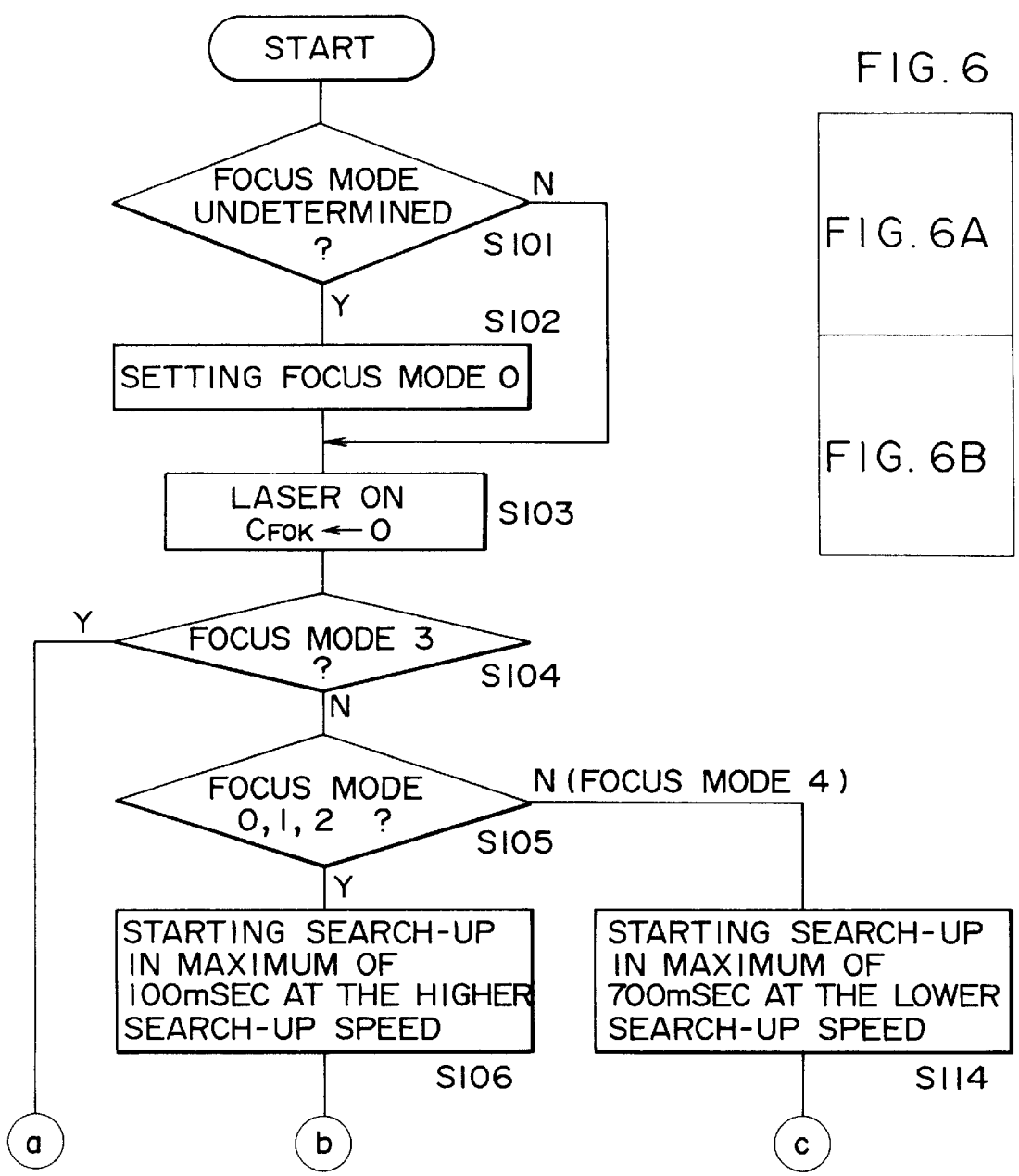

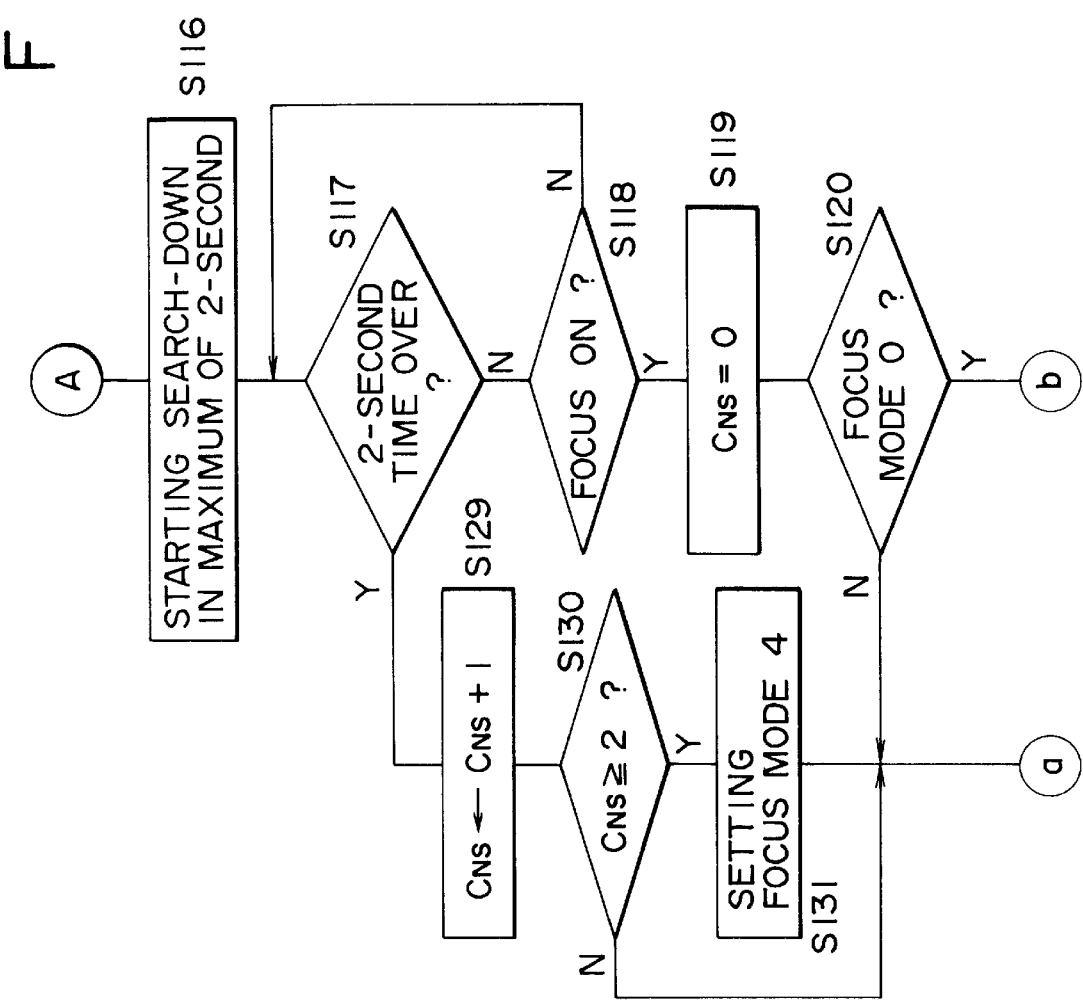

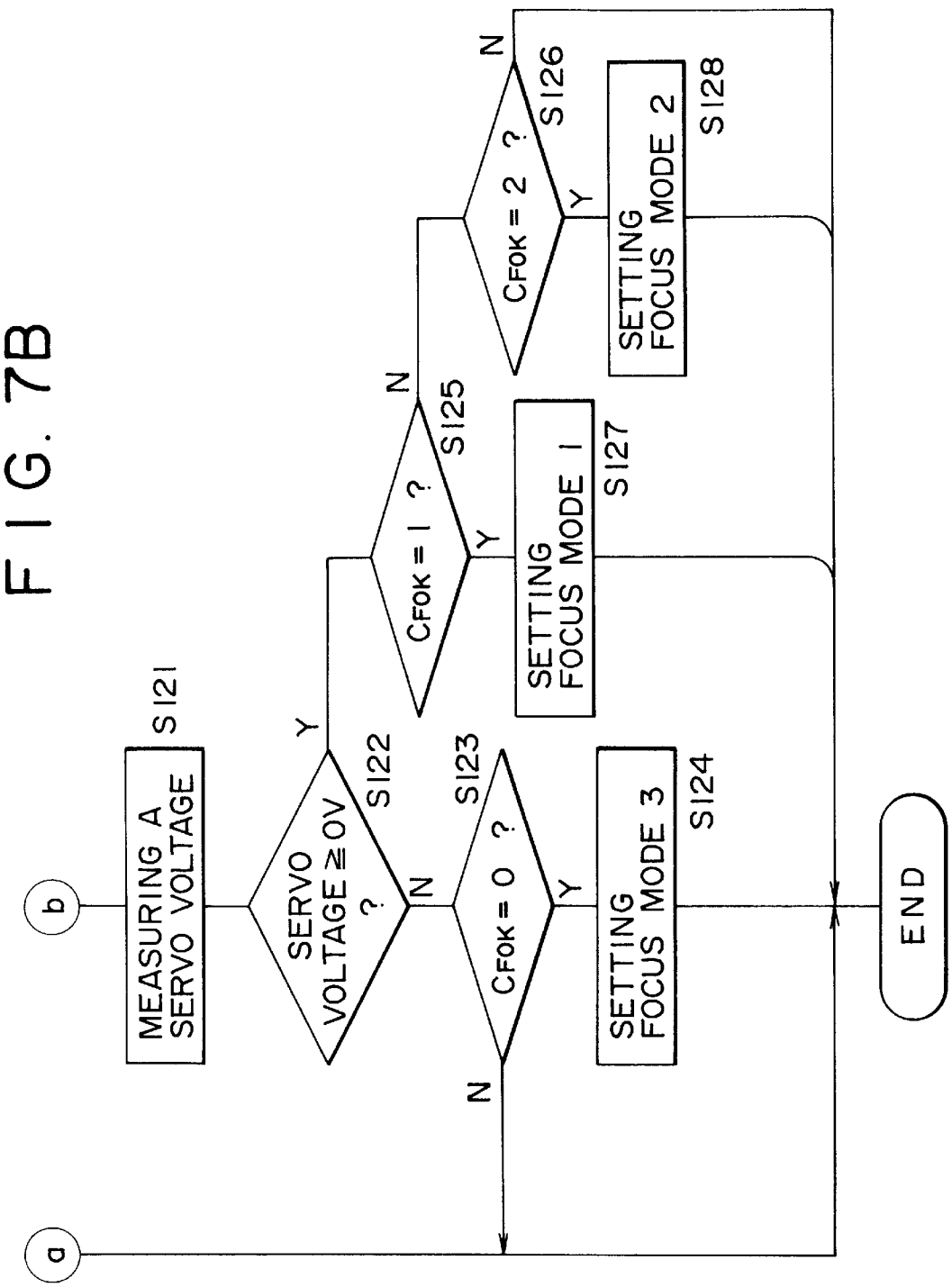

FOCUS MODE 0

FOCUS MODE 1

FOCUS MODE 2

FOCUS MODE 3

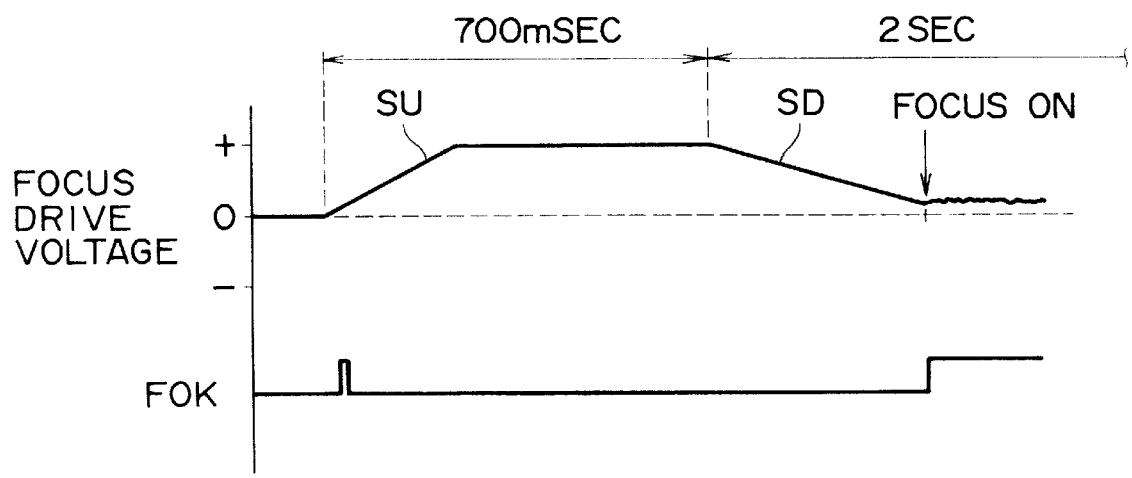

FOCUS DRIVE CIRCUIT AND FOCUS SEARCH METHOD BASED ON RELATIVE POSITIONAL RELATIONSHIP BETWEEN DISC AND OBJECTIVE LENS

BACKGROUND OF THE INVENTION

1. Field of the Invention

The present invention relates to a focus servo device which is suitable for controlling the focusing operation of an optical beam which is outputted from an optical head in the recording apparatus and reproducing apparatus corresponding to a magneto-optical disc.

2. Description of Related Art

In a recording apparatus and reproducing apparatus corresponding to a disc type recording medium such as optical disc and magneto-optical disc or the like, the optical beam outputted from the optical head must be controlled to obtain adequate focusing condition on a disc recording surface and a focus servo device is provided, for this purpose, to drive an objective lens in the optical head either towards or away from the recording surface of a disc.

Since the focus servo pull-in range is rather narrow, when the recording or reproducing operation is activated and focus servo is deviated by vibration or the like, the objective lens position is shifted up to the focus pull-in range by executing the focus search operation and thereafter the focus servo loop is turned on to execute the focus servo. As the rising process for the recording or reproducing operation, the spindle servo and tracking servo are executed, upon execution of the focus search and focus servo loop close operation. When this rising process is completed, the scanning for recording or reproducing operation can be realized with the optical beam for recording or reproducing operation.

As an example of the focus search operation employed in the optical disc reproducing apparatus, the objective lens is shifted in the direction to be in contact with or isolated from the disc surface from the intermediate point between the furthest position and the nearest position from the disk surface.

As a focus error signal FE obtained by the arithmetic process of the output of a 4-split detector for detecting a reflected beam from a disc, a curve similar to the character S as shown in FIG. 1B can be obtained within the focus pull-in range. Moreover, as the RF signal (sum signal of 4-split detector), the signal as shown in FIG. 1A can be obtained. Here, a FOK signal can also be obtained as shown in FIG. 1C by comparing the RF signal with the predetermined threshold value Th, but this FOK signal indicates the focus pull-in range.

Since the maximal value of the RF signal shown in FIG. 1A can be obtained, for example, within the range of about 1 $\mu$m to 200 $\mu$m, the focus pull-in range (FOK signal) indicated on the basis of this range also indicates the corresponding range.

With the focus search operation, when the focus servo is turned on in such a phase that the objective lens position is controlled to the focus pull-in range equivalent to the H period of this FOK signal, the adequate focus control is executed. That is, in the focus pull-in range, the focus servo control is executed to control the objective lens for the calling point of the focus zero-cross detecting signal (FZC signal, namely focus on detecting signal) shown in FIG. 1D.

FIG. 2 is a cross-sectional view showing the concept of an optical disc and a magneto-optical disc. The cross-sectional view indicates a recording surface 1a on which an audio data or the like is recorded and the surface 1b of a protective layer formed, for example, of a transparent resin or the like. In such a disc 1, the recording surface 1a is formed as the laser beam reflecting surface to reflect the light beam as indicated by the arrow mark of solid line but it is also known that the disc surface 1b also reflects to a certain degree the light as indicated by the arrow mark of a broken line and its reflectivity is assumed as about 8%. The reflectivity of the recording surface 1a is different in the optical disc and magneto-optical disc and it is assumed as about 70 to 80% in the case of the optical disc or as about 15 to 25% in the case of the magneto-optical disc.

FIG. 3A to FIG. 3E respectively show a distance of the objective lens to the disc surface, FOK signal, RF signal, focus error signal FE, FZC signal corresponding to this distance.

Here, it is assumed that the focus search operation has been conducted while the objective lens is moved closer to the disc surface from a distant position.

As shown in FIG. 3A, when the objective lens $3a_1$ is located to the focusing position for the disc surface 1b, since the surface 1b also has the reflectivity as explained above, the RF signal can be outputted as shown in FIG. 3C from the surface of substrate 1b. When the threshold value Th for the RF signal is set to the level indicated in the figure, the FOK signal can also be obtained as shown in FIG. 3C from the substrate surface 1b.

Moreover, when the objective lens comes closer to the disc surface and it is focused to the recording surface 1a as shown by the lens $3a_2$, the FOK signal can be obtained on the basis of the RF signal as shown in FIGS. 3A to 3E.

Namely, since the disc surface has a certain reflectivity, the FOK signal indicting the focus pull-in range which should naturally be obtained only at the reflecting surface may also be obtained even when the focusing is obtained for the disc surface 1b.

In the case of an optical disc such as a compact disc, since the reflectivity of the recording surface 1a is about 70 to 80% and that of the disc surface 1b is about 8%, difference is very large and it can be avoided by setting a higher threshold value Th that the FOK signal is obtained by reflection at the disc surface 1b.

In the case of a magneto-optical disc, the reflectivity at the recording surface 1a is 15 to 25% which is not so much different from that of the disc surface 1b. Therefore, separation by the threshold value Th is difficult. Therefore, in the focus search operation, if the objective lens is assumed to be moved in the direction to become closer to the disc surface from the distant position, the focus pull-in range and focus-on condition are indicated when the lens is focused at the substrate surface before these are obtained at the reflecting surface. Namely, a false FOK signal can be obtained. Of course, if the servo loop is closed with such false FOK signal, focus control may be completed erroneously.

In order to eliminate such event, a method is employed that the objective lens is forcibly moved, in the recording/reproducing apparatus for a magneto-optical disc, to the nearest position to the disc surface in the focus search operation, thereafter the objective lens is moved, from such condition, to become far from the disc and at the time of this movement, the focus servo is turned on based on the FOK signal obtained initially. For example, the Japanese Laid-open Patent No. 61-158036 (Laid-open Date: Jul. 7, 1986).

However this method has a problem that a longer time is required for the focus search because the operation that objective lens must be once located nearer to the disc surface is necessary. As the initial process in the recording/ reproducing apparatus, after the focus search and focus servo have been executed, the spindle servo and tracking servo are executed and when such initial process is completed, the recording or reproducing operation can be started. Namely, quick initializing process is required to realize the quick reproducing operation during the reproducing operation and after the access is made. For this purpose, it is the most important requirement to realize quick focus search operation which takes the longest time in the initializing operations. Accordingly, it is a serious problem that a longer time is taken by the focus search as explained above.

SUMMARY OF THE INVENTION

In view of shortening the period required for the focus search operation by overcoming the problems explained above, it is an object of the present invention to provide a focus servo device for reproducing a signal recorded on an optical disc with a driver mounted on an optical pickup to control the relative positional relationship between the optical disc and the driver, characterized in comprising a position discriminating means for discriminating relative positional relationship between a recording medium and a driver of the optical pickup under the condition that no drive signal is applied to the driver of the optical pickup, a switcher for switching the drive signal to be applied to the driver of the optical pickup during the focus search operation, and a controller for controlling to switch the drive signal of the switcher based on the discrimination result in the discriminating means.

BRIEF DESCRIPTION OF THE DRAWINGS

FIG. 1A shows an RF signal for the focus search operation.

FIG. 1B shows a focus error signal for the focus search operation.

FIG. 1C shows an FOK signal obtained by slicing the RF signal with the predetermined threshold value for the focus search operation.

FIG. 1D shows an FZC signal obtained by slicing the focus error signal with the predetermined threshold value for the focus search operation.

FIG. 2 is a schematic diagram of an optical beam applied to an optical disc and a cross-section of an optical disc.

FIG. 3A is a schematic diagram of an optical beam applied to an optical disc and a cross-section of an optical disc.

FIG. 3B shows an FOK signal obtained by slicing the RF signal with the predetermined threshold value for the focus search operation.

FIG. 3C shows an RF signal for the focus search operation.

FIG. 3D shows a focus error signal for the focus search operation.

FIG. 3E shows an FZC signal obtained by slicing the focus error signal with the predetermined threshold value for the focus search operation.

FIG. 4 is a block diagram applied to the present invention.

FIG. 5A is a schematic diagram showing the first positional condition of an objective lens.

FIG. 5B is a schematic diagram showing the second positional condition of an objective lens.

FIG. 5C is a schematic diagram showing the third positional condition of an objective lens.

FIGS. 6A and 6B are a flowchart of the focus search operation applied to the present invention.

FIGS. 7A and 7B are a flowchart of the decision process of the focus mode in the focus search operation applied to the present invention.

FIG. 12 shows the focus drive voltage and FOK signal when the focus mode is determined to 4 in the focus search operation in the focus mode 0.

DETAILED DESCRIPTION OF THE PREFERRED EMBODIMENTS

Figure 6B:
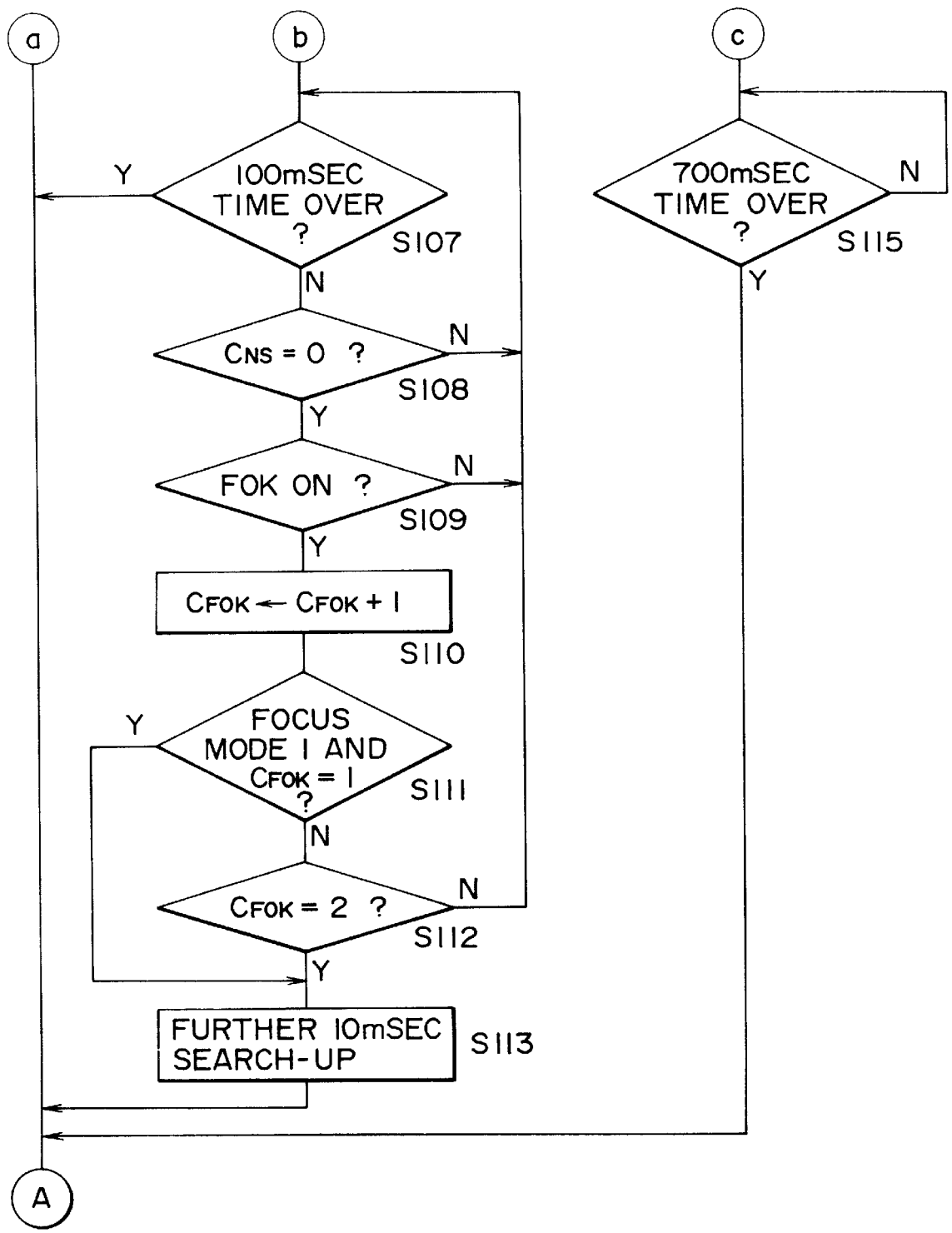

A preferred embodiment of the present invention will be explained with reference to FIG. 4 to FIG. 12. In this embodiment, the focus servo device mounted into a recording/reproducing apparatus using a mini-disc, which is a kind of a magneto-optical disc is considered as an example and it will be explained in the following sequence.

1. Structure of a recording/reproducing apparatus
2. Positional condition of an objective lens when there is no focus drive signal
3. Operation in the focus mode 0
4. Operation in the focus mode 4
5. Operation in the focus mode 1
6. Operation in the focus mode 2
7. Operation in the focus mode 3
8. Effect of this embodiment
    1. Structure of a recording/reproducing apparatus FIG. 4 is a block diagram of the essential portion of a recording/reproducing apparatus.

A magneto-optical disc 1 (mini-disc) on which audio data is recorded is rotatably driven by a spindle motor 2. The magneto-optical disc 1 is irradiated with a laser beam at the time of recording/reproducing operation by an optical head 3.

The optical head 3 outputs a laser beam of such a higher level as heating the recording track, during the recording operation, up to the Curie temperature and also outputs a laser beam of such a lower level as detecting data, during the reproducing operation, from the reflected laser beam owing to the magnetic kerr effect.

The optical head 3 is provided with an optical system, as a laser beam output means, consisting of a laser diodes a polarized beam splitter and an objective lens 3*a* or the like and a detector for detecting the reflected laser beam. The objective lens 3*a* is held, by a 2-axis mechanism 4, movable along an axis substantially parallel to the disc's radius or along an axis substantially perpendicular to the plane of the disc from the disc.

A magnetic head 6*a* is located at the position opposed to the magnetic head 3 sandwiching the disc 1. The magnetic head 6a operates to apply the magnetic field modulated by data supplied to a magneto-optical disc 1.

The optical head 3 as a whole and the magnetic head 6a may be moved by the sled mechanism 5 in the disc radius direction.

The information detected from the disc 1 by the optical head 3 is supplied to an RF amplifier 7 by the reproducing operation. The RF amplifier 7 extracts, with the arithmetic operation of information supplied, the reproduced RF signal, tracking error signal TE, focus error signal FE and group information GFM (absolute positional information recorded as a pregroup (wobbling group) in the magneto-optical disc 1), etc.

The extracted reproduced RF signal is supplied to an encoder/decoder 8. Moreover, the tracking error signal TE and focus error signal FE are supplied to a servo circuit 9 and the group information GFM is supplied to an address decoder 10.

The servo circuit 9 generates a variety of servo drive signals with the tracking error signal TE, focus error signal FE supplied, track jump command and access command from a system controller 11 formed by a microcomputer and with a rotating velocity detecting information of the spindle motor 2 to control the 2-axis mechanism 4 and sled mechanism 5 for the purpose of focus and tracking control and to control the spindle motor 2 to the constant line velocity (CLV).

Particularly, as the focus servo control, a focus drive signal is generated on the basis of the focus error signal FE and it is then applied to a focus coil of the 2-axis mechanism 4 to keep the objective lens 3a in the condition focused to the recording surface of the disc 1.

As explained above, the focus search operation to locate the objective lens 3a to the focus pull-in range is performed as the preprocessing for closing the focus servo loop and executing the focus servo operation based on the focus error signal FE, but as this focus search operations the five operation modes of focus mode 0 to 4 are prepared to generate the search drive signal depending on the mode control of the system controller 11. When the search drive signal is applied to the focus coil in the 2-axis mechanism 4, the objective lens 3a is forcibly moved for the focus search. Operations of the focus modes 0 to 4 will be explained later.

The FOK signal which will become the focus pull-in range detecting signal for transition to the focus servo operation from the focus search operation is generated by the RF amplifier 7 and is then supplied to the system controller 11. Namely, as explained with reference to FIG. 1C, the RF amplifier 7 generates the FOK signal by comparing the RF signal with the predetermined threshold level.

The system controller 11 executes the control for the focus search/servo operations to the servo circuit 9 on the basis of the FOK signal.

An address decoder 10 extracts an address information by decoding the group information GFM supplied. This address information is supplied to the system controller 11 for various control operations.

The reproduced RF signal is rendered, in the encoder/decoder 8, the decoding process such as EFM (Eight Fourteen Demodulation) and CIRC (Cross Interleave Reed Solomon Coding). In this case, the address and subcode included in the reproduced RF signal as the data are also extracted and are then supplied to the system controller 11.

The audio data having undergone the decoding processes such as EFM and CIRC in the encoder/decoder 8 is once written into a buffer memory 13 by a memory controller 12. Data reading by optical head 3 from the disc 1 and transfer of reproduced data in the system from the optical head 3 to the buffer memory 13 are performed intermittently at the rate of 1.41 Mbit/sec.

The data written in the buffer memory 13 is read in the timing which assures the transfer rate of 0.3 Mbit/sec for the reproduced data and is then supplied to the encoder/decoder 14. The audio signal expanding and compressing process is executed in the audio signal expanding/compressing encoder/decoder 14. Thereby the reproduced data is converted to an analog signal by a D/A converter 15 and it is then supplied to the predetermined amplifier circuit from an output terminal 16 as the reproduced output. For instance, this reproduced signal is outputted as the L and R analog audio signals.

For execution of the recording operation to the magneto-optical disc 1 the recording signal (analog audio signal) supplied to an input terminal 17 is converted into digital audio data in the A/D converter 18 and is then supplied to the encoder/decoder 14 from the audio compression encoding.

The recording data compressed by the encoder/decoder 14 is once written into a buffer memory 13 by the memory controller 12. When the data exceeding the predetermined amount is accumulated within the buffer memory 13, the data is read in the predetermined unit and is then transferred to the encoder/decoder 8. The data is then supplied to the magnetic head drive circuit 6, upon completion of the encoding process such as CIRC encoding and EFH modulation in the encoder/decoder 8.

The magnetic head drive circuit 6 supplies the magnetic head drive signal to the magnetic head 6a depending on the encoded recording data. That is, the magnetic head 6a is caused to apply the N or S magnetic field to the magneto-optical disc 1. Moreover, in this case, the system controller 11 supplies the control signal to the optical head to output the laser beam of the recording level.

The recording operation of the continuously inputted audio data is executed intermittently via the buffer memory 13.

An operating means 19 is provided with various kinds of keys used for user's operation. For instance, the recording key, reproducing key, stop key, AMS (Auto Music Scan) key, fast feed key, fast rewind key are provided and operating information of these keys is supplied to the system controller 11.

A display means 20 is formed, for example, of a liquid crystal display which displays the operating condition, program number and time information, etc. under the control of the system controller 11.

In the recording/reproducing apparatus explained above, the focus servo device as a preferred embodiment of the present invention is composed of a focus search/servo system circuit in the servo circuit 9 and the system controller 11.

2. Positional condition of an objective lens when there is no focus drive signal When the servo circuit 9 does not apply the drive signal to the focus coil of the 2-axis mechanism 4, that is, when the objective lens 3a is located in the mechanical center position, the positional relationship in the focus direction of the objective lens 3a and disc 1 may roughly be classified into three conditions as shown in FIGS. 5A, 5B, 5C.

In FIG. 5A, the focal point SP of the laser beam outputted from the objective lens 3a is located between the recording surface 1a which is formed as a magneto-optical film to which the magnetizing recording operation is performed on the magneto-optical disc 1 and the disc surface 1b.

In FIG. 5B, the focal point SP of the laser beam outputted from the objective lens 3a is located at the position before the surface 1b of the magneto-optical disc 1.

In FIG. 5C, the focal point SP of the laser beam outputted from the objective lens 3a is located far from the recording surface 1a of the magneto-optical disc 1.

These three positional conditions are generated by various kinds of causes, for example, mechanical fitting position error of the optical head 3 and 2-axis mechanism 4, elastic characteristic in the focusing direction of the 2-axis mechanism, moreover chucking error, surface deflection and thickness error of the disc to be loaded and these are positional conditions generated under the condition that a certain disc is loaded on a certain recording/reproducing apparatus.

Namely, each time when a disc 1 is newly loaded to the recording/reproducing apparatus, the positional relationship in the focus direction of the objective lens 3a and disc 1 generally takes any condition among those shown in FIGS. 5A, 5B and 5C.

As described above, the reflected laser beam can be obtained not only from the recording surface 1a but also from the disc surface 1b and therefore a false FOK signal is generated under the condition that the focal point position of the laser beam is located near the surface of disc 1.

In this embodiment, the system controller 11 discriminates in what condition among those of FIGS. 5A, 5B, 5C the positional relationship of the objective lens 3a and the disc 1 is set while the objective lens 3a is set free and the quick focus search is realized, even if a false FOK signal is generated, by controlling the focus search operation depending on the discrimination result.

In the following detail description, the focus search operation corresponding to the three positional conditions of FIGS. 5A, 5B, 5C will be briefly explained below.

In the case of FIG. 5A, the objective lens 3a is forcibly moved in such a direction as coming up to the disc 1 (search-up). The FOK signal detected first in this search-up period becomes the true FOK signal due to the beam reflected from the recording surface 1a. Therefore, when the FOK signal is detected after the search-up operation, the focus servo is turned on in this timing.

In the case of FIG. 5B, the objective lens 3a is forcibly moved in such a direction as coming up to the disc 1. The FOK signal detected first in this search-up period is a false FOK signal due to the reflection at the disc surface and the FOK signal detected second becomes the true FOK signal due to the laser beam reflected from the recording surface 1a. Therefore, when the second FOK signal is detected in the search-up period, the focus servo is turned on at this time.

In the case of FIG. 5C, the objective lens 3a is forcibly moved in such a direction as becoming far from the disc 1 (search-down). The FOK signal detected first in this search-down period becomes the true FOK signal due to the beam reflected from the recording surface 1a. Therefore, when the FOK signal is detected by the search-down operation, the focus servo is turned on at this time.

For execution of these operations, the current positional condition between the disc 1 and objective lens 3a must be discriminated first among those described above.

Therefore, during the first focus search operation when a disc 1 is loaded, the search operation is carried out under the focus mode 0. The positional condition of the objective lens in the search operation under the search mode 0 is discriminated and the focus mode 1 is determined for the condition of FIG. 5A, while the focus mode 2 is for the condition of FIG. 5B and the focus mode 3 for the condition of FIG. 5C.

When the focus mode is set, the search operation is carried out depending on the focus mode in the next and subsequent focus search operations.

If the focusing operation fails continuously for two times in a certain search operation, operation is executed under the focus mode 4.

Operations in the focus modes 0 to 4 will be explained below in detail.

3. Operation in the focus mode 0

Operation in the focus mode 0, that is, the focus search operation when the focus mode is not determined will be explained first with reference to FIGS. 6, 7, 8A, 8B, 8C.

FIG. 6 and FIG. 7 show the flowcharts indicating the processings of the system controller 11 for the focus search operation.

During the first initializing operation after the disc 1 is loaded, the focus mode is not yet set and in this case the focus search is performed under the focus mode 0.

If the focus mode is not yet determined when the search process of FIG. 6 is executed; the operation proceeds to the step S102 from the step S101, setting the focus mode 0.

For initiation of the focus search operation, the optical head 3 is caused to emit the laser beam in the step S103 and the system controller 11 initializes the value of FOK counter $C_{FOK}$ as the internal counter to zero.

Since the focus mode is set to 0, the process proceeds to the step S106 from the step S105. Here, a high speed search-up velocity is set to initiate the search-up operation with the maximum search-up time of 100 msec. In this case, time count is started with initiation of the search-up operation.

Figure 8A:
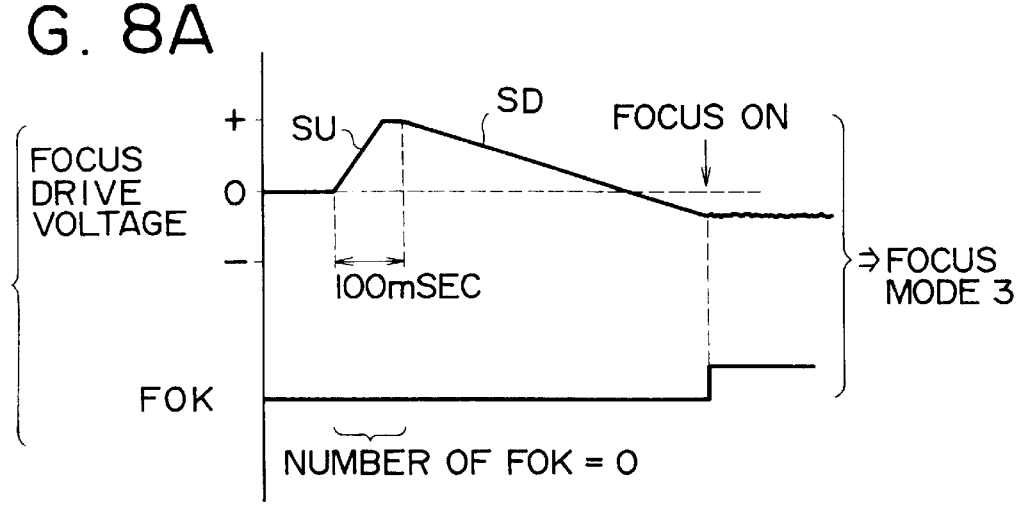
FIG. 8A shows the first profile of the focus drive voltage and FOK signal in the focus mode 0.

As shown as the search-up SU in FIG. 8A, the focus drive voltage is increased within the maximum period of 100 msec to forcibly have the objective lens 3a to come up to the disc 1.

In this timing, since the mechanical center position of the objective lens 3a is not yet detected, the objective lens 3a is moved first to the nearest position to the disc 1 by the search-up operation.

Figure 8B:
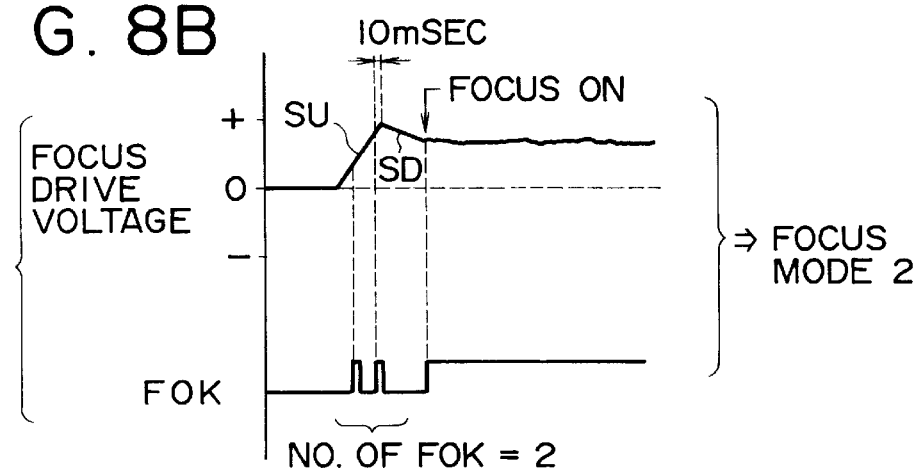
FIG. 8B shows the second profile of the focus drive voltage and FOK signal in the focus mode 0.

FIGS. 8A, 8B respectively show operation examples considered in the focus search operation under the focus mode 0.

After the search-up operation is started in the step S106, the processings of the steps S108 to S112 are performed until it is judged in the step S107 that the maximum search-up time of 100 msec has been obtained and the search-up process is completed from the step S107 when the search-up time has reached 100 msec.

In some cases, the search-up process may be completed, from the step S113, before the search-up time reaches 100 msec.

During the search-up SU operation, an NG counter $C_{NG}$ which indicates the number of times the failure of the servo pull-in operation is confirmed in the step S108. At the time of the first focus search operation, since NG counter $C_{NG}=0$, process proceeds to the step S109.

In the step S109, whether the FOK signal turns to H level or not is detected, and when rise of the FOK signal is detected during the search-up SU operation, the process proceeds to the step S110 to give increment of the value of the FOK counter $C_{FOK}$.

Since the focus mode is set to 0, the process proceeds to the step S112 from the step S111 and the process returns to the step S107, if the FOK counter $C_{FOK}$ does not indicate 2.

If rise of the FOK signal is not detected in the step S109, the process returns to the step S107.

When the process returns to the step S107, if 100 msec has passed from initiation of the search-up operation, the search-up process is completed.

Moreover, when the FOK counter CFOK indicates 2 in the step S112, the process proceeds to the step S113 and the search-up process is completed after the search-up operation of 10 msec, even if 100 msec has not passed from initiation of the search-up process.

Figure 8C:
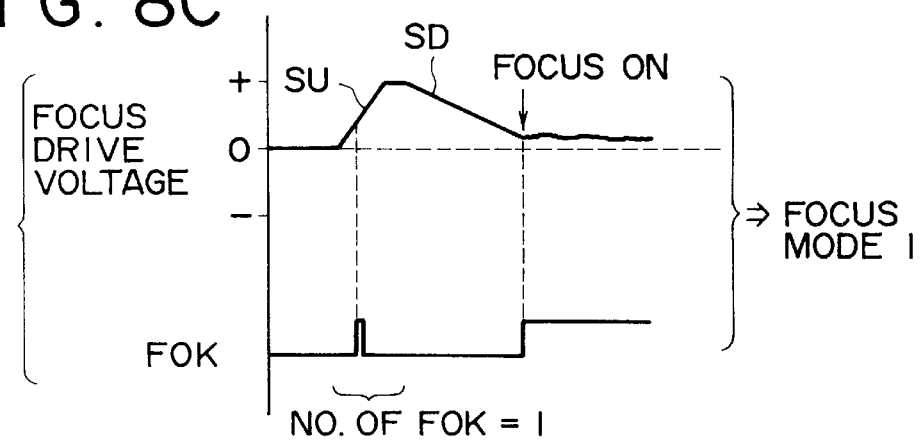
FIG. 8C shows the third profile of the focus drive voltage and FOK signal in the focus mode 0.

The operations shown in FIG. 8A to FIG. 8C can be performed by the processes explained above.

FIG. 8A shows the profile where the search-up SU process has been completed after 100 msec has passed During this process, the FOK signal has been detected in the step S109 but as shown in the figure, since the FOK signal is not yet detected during the search-up operation, the FOK counter $C_{FOK}$ indicates 0 when the search-up US process is completed.

FIG. 8B shows the profile where the FOK signal is detected in the step S109 during execution of the search-up SU process and thereby two FOK signals can be observed. Since the FOK counter $C_{FOK}$ indicates 2 ($C_{FOK}$=2) when the second FOK signal is confirmed, the process proceeds to the step S113 from the step S112 and when the search-up is further executed for 10 msec, the search-up SU is completed.

FIG. 8C shows the profile where the search-up SU is completed when 10 msec has passed. As shown in the figure, since one FOK is observed during the search-up operation, the FOK counter $C_{FOK}$ indicates 1 when the search-up SU process is completed.

When the search-up SU process is completed due to the operations shown in FIGS. 8A to 8C in the focus mode 0, the process skips to the process of FIG. 7 and the objective lens 3a is in turn moved in such a direction as becoming far from the disc 1 by the search-down SD process.

As shown in the step S116, two seconds in maximum are set as the period of the search-down SD operation and the objective lens 3a is moved in the down direction at the predetermined search speed.

During this search-down SD period, the system controller 11 watches the FOK signal and closes the servo loop at the time of having obtained the FOK signal to execute the focus servo. Therefore, the search-down speed is set to a rather lower speed so that the focus can be pulled in when the servo is turned on with detection of the FOK signal.

During the search-down SD period, the search-down period is checked in the step S117 and whether the servo pull-in is executed successfully or not based on detection of the FOK signal is watched in the step S118.

In the case of FIGS. 8A, 8B, 8C, the focus servo pull-in is realized when the focus-on is attained.

Namely, these figures show that the servo pull-in is activated when the FOK signal is obtained first from initiation of the search-down SD process and the servo pull-in is completed successfully.

In the case of FIGS. 8A and 8C, the objective lens 3a is moved to the position nearest the disc 1 by the search-up SU process and is then moved again by the search-down. Therefore, the FOK signal obtained first is the true FOK signal and the servo pull-in is executed adequately In the search-up SU process shown in FIG. 8B, the objective lens 3a is not always moved to the position nearest the disc 1 but the FOK signal is observed twice during the search-up SU process. Therefore, when the search-down SD is started, the objective lens 3a is located at the position nearer the disc then the position where the true FOK signal can be obtained. Therefore, in this case, the FOK signal obtained first during the search-down process is the true FOK signal and the servo pull-in can be done adequately.

When the servo pull-in is completed successfully the process skips to the step S119 to clear the NG counter $C_{NG}$ and then skips to the step S120 to check the focus mode. In this step, it is checked whether the focus mode is 0 or not, namely whether the focus mode is determined or not.

Since the focus mode is 0, the process proceeds to the step S121 and the focus mode is set as the subsequent process.

In the step S121, the servo drive voltage being applied to the focus coil of the 2-axis mechanism 4 when the focus servo is activated is measured. In the step S122, whether the servo drive voltage is 0 V or higher or not is discriminated.

When the objective lens 3a is located at the mechanical center position to which no drive voltage is applied under the condition of FIG. 5A or FIG. 5B, the focus point is located at the position nearer the disc 1 than the position in the free condition. Therefore, the drive voltage must be a positive value when the servo pull-in is executed (however, it is assumed that drive in such a direction as coming up to the disc 1 is performed by the positive voltage).

Meanwhile, when the objective lens 3a is located at the mechanical center position to which no drive voltage is applied under the condition of FIG. 5C, the focus point is located at the position farther from the disc 1 than the mechanical center position. Therefore, the drive voltage must be a negative value when the servo pull-in is executed.

The polarity of the drive voltage during the servo-on period is inversed when the mechanical center position is in the condition of FIG. 5A and FIG. 5B or in the condition of FIG. 5C. A positive value or a negative value in the conditions explained above is naturally determined depending on the 2-axis mechanism and servo drive circuit structure.

For example, when the servo drive voltage is judged lower than 0 V in the step S122, it can be assumed that the positional relationship between the objective lens 3a and disc 1 at the mechanical center position is in the condition of FIG. 5C. Therefore, in the step S123, the FOK counter $C_{FOK}$ is checked. When the positional relationship is in the condition of FIG. 5C, the FOK signal must not be obtained in the search-up SU period. That is, the FOK counter $C_{FOK}$ must indicate 0. Therefore, when FOK counter $C_{FOK}$=0 is checked, the positional relationship at the mechanical center position is judged in the condition of FIG. 5C and the setting to the focus mode 3 is executed in the step S124.

On the other hand, when the servo drive voltage is judged 0 V or higher in the step S122, the positional relationship between the objective lens 3a and disc 1 under the free condition may be assumed to be in any condition of FIG. 5A or FIG. 5B. Therefore, the FOK counter $C_{FOK}$ is checked in the steps S125 and S126. When the positional relationship is in the condition of FIG. 5A, the FOK signal is obtained once in the search-up SU period and the FOK counter $C_{FOK}$ must indicate 1. Therefore, when FOK counter $C_{FOK}$=1 is checked, the positional relationship at the mechanical center position is judged to be in the condition of FIG. 5A and the setting to the focus mode 1 is executed in the step S127.

When such positional relationship is judged to be in the condition of FIG. 5B, the FOK signal can be obtained twice during the search-up SU period and the FOK counter $C_{FOK}$ must indicate 2. Therefore, when FOK counter $C_{FOK}$=2 is checked in the step S126, the positional relationship at the mechanical center position is judged to be in the condition of FIG. 5B, the setting to the focus mode 2 is executed in the step S128.

When the negative result is obtained in any step of the steps S123, S126, it suggests that the voltage condition of the focus servo-on condition contradicts the number of FOK signals detected during the search-up SU process with a certain reason. In this case, the positional relationship in the free condition is not judged, namely processing is completed under the focus mode 0. Therefore, setting of the focus mode is transferred to the next or the subsequent focus search process.

As explained above, in the focus search under the focus mode 0 (namely, focus mode is not yet determined), whether the positional relationship at the mechanical center position is in the condition of FIGS. 5A, 5B, 5C is judged basically depending on the number of FOK signals obtained in the search-up SU period and thereby the focus mode for the next and subsequent focus search operation is set. Therefore, not only the value of the FOK counter CFOK but also the drive voltage during servo-on are considered for the judgment in order to surely enhance the reliability for judgment in the conditions of FIGS. 5A, 5B and 5C and prevent erroneous operation by erroneous setting of the focus mode.

The preset focus mode is fixed until the disc 1 is unloaded from the recording/reproducing apparatus. However, it is conceivable as will be explained later that the focus mode is changed to 4 depending on the condition for the failure of the subsequent focus search.

In some cases, the focus servo is never pulled in the focus search under the focus mode 0 even by executing the search-down SD process for two seconds in maximum. In this case, the process skips to the step S129 from the step S117 to give an increment to the NG counter $C_{NG}$. That is, it is counted up as the number of failures of the servo pull-in.

In the step S130, whether the NG counter $C_{NG}$ indicates 2 or higher is checked. Since the NG counter $C_{NG}$ indicates 1 when the servo pull-in fails during the first search-down SD operation, the process of FIG. 7 is completed and the focus servo is retried under the focus mode 0 by returning to the process of FIG. 6. That is,, the operations explained previously are attempted again for the servo pull-in. In this case, since the NG counter does not indicate 0, the negative result is issued in the step S108, that is, the search-up SU is surely executed in the period of 100 msec and the objective lens 3a is moved up to the position nearest the disc 1.

However, if the servo pull-in is disabled even in the second focus search operation, the NG counter $C_{NG}$ is given the increment in the step S129 and the NG counter $C_{NG}$ indicates 2.

Namely, the NG counter CNG indicates 2 when the servo pull-in fails continuously two times or more. In this case, the focus mode 4 is set in the step S131 for the retry of the focus search under the condition of the focus mode 4. When the focus mode 4 is set, this focus mode 4 is fixed until the disc 1 is unloaded from the recording/reproducing apparatus.

4. Operation in the focus mode 4

Prior to the operations in the focus modes 1 to 3, operation in the focus mode 4, which is set when the servo pull-in fails continuously for two or more times during a certain focus search operation, will be explained.

When the focus mode 4 is once set, all focus search operations are performed subsequently under the focus mode 4 until the disc 1 is exchanged.

In the case of this embodiment, the search operation is performed quickly because the focus search operation is executed in any of the focus modes 1 to 3. Meanwhile, the operation in the focus mode 4 is basically similar to the focus search operation in the prior art and therefore quick focus search operation is not assured. However, if the failure of the servo pull-in is repeated even when the search operation is executed in focus modes 0, 1, 2 or 3, the reliability of the search operation is guaranteed because the focus mode 4 is set, giving contribution to improvement in reliability of the device operation.

Operation in the focus mode 4 is explained with reference to FIGS. 6, 7 and 12.

The process when the focus search is executed in the focus mode 4 proceeds to the step S114 from the step S105 in FIG. 6.

In this case, the search-up speed lower than that in the focus mode 0 is set and the search-up operation is started by setting the maximum search-up time to 700 msec.

That is, the focus drive voltage of the search-up SU operation shown in FIG. 12 is increased in the maximum period of 700 msec to move the objective lens 3a up to the position nearest the disc 1. Here, the longer period of 700 msec is prepared to surely move the objective lens 3a to the position nearest the disc 1 even when the objective lens 3a at the mechanical center position is located in any position (even if it is located at the position furthest from the disc 1).

Upon confirmation of the passage of time of 700 msec in the step S115, the search-up is completed and the search-down SD is started in the step S116 of FIGS. 7. The FOK signal is watched during the search-down operation in maximum of 2 seconds and when the FOK signal is confirmed, the servo pull-in is executed as shown in FIG. 12. In this case, since the objective lens 3a is moved up to the position nearer the disc 1 by the search-up SU operation, the FOK signal detected first in the search-down SD operation is the true FOK signal.

When the servo pull-in is completed successfully, the NG counter C NG is cleared in the step S119. Since the negative result is issued in the step S120, the focus search is completed.

If the servo pull-in is disabled in the search-down SD operation of 2 seconds, the focus search is retried under the focus mode 4.

5. Operation in the focus mode 1

The focus search operation when the focus mode 1 is set in the step S127 when focus search is executed in the focus mode 0 will be explained with reference to FIGS. 5A, 6 and 9.

In this case, the positional relationship between the objective lens 3a at the mechanical center position and the disc 1 is judged to be in the condition of FIG. 5A by the first focus search operation in the focus mode 0 and operation is carried out in the subsequent focus search operation as the focus mode 1 corresponding to the positional relationship of FIG. 5A.

In the positional relationship of FIG. 5A at the mechanical center position, the FOK signal obtained first by search-up of the objective lens 3a is the true FOK signal. Therefore, when the FOK signal is obtained by the search-up operation, the servo pull-in can be activated successfully.

When the focus search is started in the focus mode 1, the process skips to the step S106 from the step S105. The high speed search-up operation is set and the search-up is started in the maximum search-up time of 100 msec in this step.

When the FOK signal is confirmed in the step S109, the FOK counter $C_{FOK}$ indicates 1 in the step S110 and the process proceeds to the step S111. Since the FOK counter $C_{FOK}$ indicates 1 in the focus mode 1, the search-up operation is completed after the search-up of further 10 msec in the step S113.

In the step S116 of FIG. 7, the search-down SD is initiated and the servo pull-in is activated in the confirmed timing of the FOK signal.

When the servo pull-in is completed successfully, the process proceeds to the steps S119 and S120 to complete the focus search operation.

Figure 9:
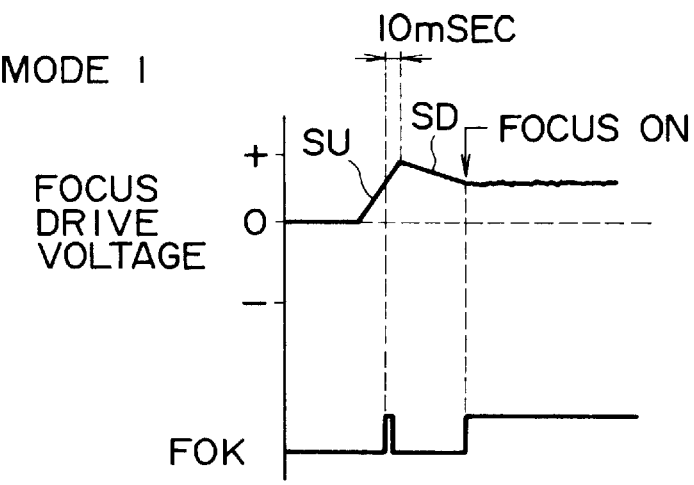
FIG. 9 shows the focus drive voltage and FOK signal when the focus mode is determined to 1 in the focus search operation in the focus mode 0.

In the above operation, the search-up SU is completed when the search-up is executed for 10 msec more the FOK signal is detected in the search-up SU period as shown in FIG. 9 and the search-down operation is immediately executed and the focus servo pull-in is executed at the time of detecting the FOK signal. Thereby, the search-up is not executed until the lens is moved to the position nearest the disc. Moreover, since the search-down is also executed for only a short period, the very quick focus search is completed.

Even when the FOK signal is detected during the search-up operation, the servo pull-in is not immediately executed because there is a higher possibility for the failure of the servo pull-in due to the search-up operation of higher speed. Therefore, when the search-up is executed only a short period (for about 10 msec), operation is switched to the search-down SD and the servo pull-in is surely executed in the timing of the FOK signal detected first during the search-down SD operation.

If the servo pull-in fails during the search-down process in maximum of two seconds, the process proceeds to the step S129 to retry the focus search in the focus mode 1. If the servo pull-in still fails even in above condition, the focus mode is changed to 4 in the step S131 and retry is executed in the operation explained above.

6. Operation in the focus mode 2

The focus search operation when the focus mode 2 is set in the step S128 after the focus search in the focus mode 0 is executed will be explained with reference to FIGS. 5B, 6 and 10.

In this case, the positional relationship between the objective lens 3a at the mechanical center position in the initial condition and the disc 1 is judged to be in the condition of FIG. 5B by the first focus search operation in the focus mode 0 and the operation as the focus mode 2 corresponding to the positional relationship of FIG. 5B is carried out during the subsequent focus search operation.

In the case of the positional relationship of FIG. 5B at the mechanical center position, the second FOK signal obtained during the search-up operation is the true FOK signal. Therefore, when the second FOK signal is obtained after initiation of the search-up operation, the servo pull-in can be activated.

When the focus search is started in the focus mode 2, the process proceeds to the step S106 from the step S105 of FIG. 6, the higher search-up speed is set to start the search-up operation in the maximum search-up period of 100 msec.

When the FOK signal is detected in the step S109, the FOK counter $C_{FOK}$ indicates 1 in the step S110. However, since the negative result is issued in the steps S111, S112, the process returns to the step S107 for continuation of the search-up process. When the FOK signal is further detected in the step S109 the FOK counter CFOK indicates 2 in the step S110 and the positive result is issued in the step S112. Therefore, the search-up process is completed after executing the search-up SU operation for only 10 msec more in the step S113.

In the step S116 of FIG. 7, the search-down SD is started and the servo pull-in is activated at the time of having detected the FOK signal.

When the servo pull-in is completed successfully the process proceeds to the steps S119 and S120 to complete the focus search process.

Figure 10:
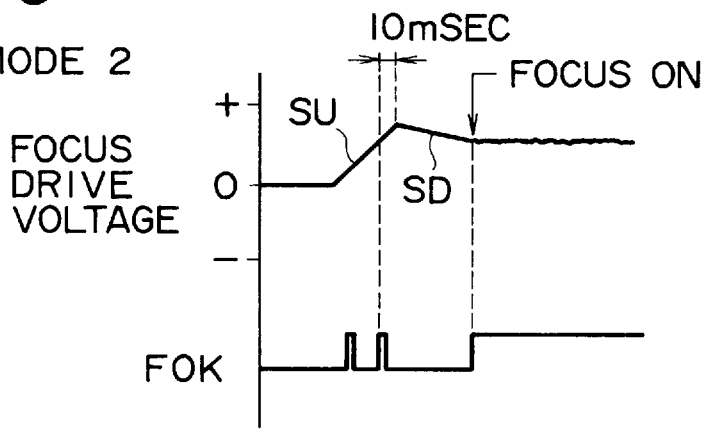
FIG. 10 shows the focus drive voltage and FOK signal when the focus mode is determined to 2 in the focus search operation in the focus mode 0.

In the above operation, as shown in FIG. 10, when the second FOK signal is detected in the search-up SU period, the search-up SU is completed after the search-up operation is executed for 10 msec more. Immediately after the search-up operation, the search-down operation is carried out to activate the servo pull-in at the time of having detected the FOK signal.

Thereby, the search-up process is never carried out up to the position nearest the disc and the search-down process is also executed for only a short period. As a result, a very quick focus search can be completed.

Here, the servo pull-in is not executed immediately after the second FOK signal is detected during the search-up process because of the same reason as that in the focus mode 1.

If the servo pull-in fails during the search-down period of two seconds in maximum, the process proceeds to the step S129 to execute a focus search retry in the focus mode 2. If the servo pull-in still fails, the focus mode is changed to 4 in the step S131 to attempt the retry in the operation explained above.

7. Operation in the focus mode 3

The focus search operation where the focus mode 3 is set in the step S124 when the focus search in the focus mode 0 is executed will be explained with reference to FIG. 5C, FIG. 6 and FIG. 11.

In this case, the positional relationship between the objective lens 3a at the mechanical center position and disc 1 is judged to be in the condition of FIG. 5C by the first focus search operation in the focus mode 0 and the operation in the focus mode 0 corresponding to the positional relationship of FIG. 5C is performed during the subsequent focus search operation.

In the case of the positional relationship of FIG. 5C at the mechanical center positions the FOK signal obtained first in the search-down process of the objective lens 3a is the true FOK signal. Therefore, the search-down process is executed without execution of search-up process and when the first FOK signal is obtained, the servo pull-in is activated.

When the focus search is started in the focus mode 3, the process of FIG. 7 is activated from the step S104 of FIGS. 6. Namely, the search-up process is not carried out. The search-down SD is started in the step S116 of FIG. 7 and the servo pull-in is activated at the time of having detected the FOK signal.

When the servo pull-in is completed successfully, the process proceeds to the steps S119 and S120 to complete the focus search operation.

Figure 11:
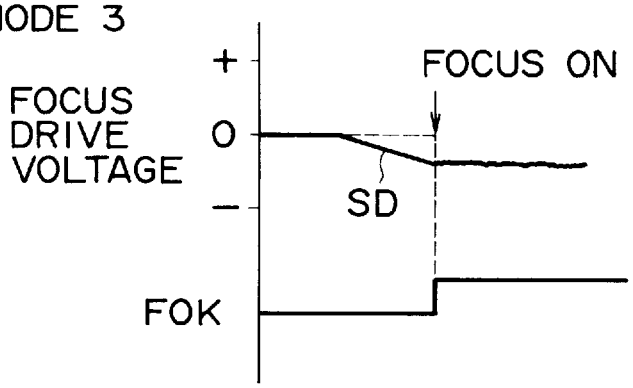
FIG. 11 shows the focus drive voltage and FOK signal when the focus mode is determined to 3 in the focus search operation in the focus mode 0.

In the above operations as shown in FIG. 11, the search-down SD is suddenly started and the focus servo pull-in is executed at the time of having detected the FOK signal. Thereby, useless search-up process is never performed and the search-down process is executed only for a short period and thereby the focus search is completed very quickly.

If the servo pull-in fails during the search-down process, the process proceeds to the step S129 and the subsequent steps to attempt the focus search retry in the focus mode 3. When the servo pull-in still fails, the focus mode is changed to mode 4 in the step S131 and the retry is performed in the operation explained above.

8. Effect of the present embodiment

In the focus servo device of the present embodiment explained above, the positional relationship between the objective lens 3a and disc 1 in the condition where no drive voltage is applied is discriminated, and thereafter the optimum focus search operation (operation in any of the focus modes 1, 2 or 3) is executed depending on the positional relationship explained above to complete the focus search process very quickly.

Thereby, quick rise of the initial operation can be realized and audio signal output after the access can also be started quickly.

Since discrimination of the positional relationship between the objective lens 3a and disc 1 is executed in every exchange of the disc 1, the best focus search operation can be realized depending on the loading condition and individual characteristic of the disc.

In the case of this embodiment, discrimination of the positional relationship between the objective lens 3a and disc 1 is executed depending on the number of FOK signals during the search-up process. However, still more accurate discrimination may be realized by also making reference to the drive voltage during the focus servo-on period and inadequate search operation by erroneous discrimination can be prevented almost perfectly.

Moreover, when the FOK signal is obtained twice during the search-up process, the search-up process is stopped at this time (after 10 msec). Accordingly, useless search-up time can be eliminated, which will greatly contribute to the realization of a quick search operation.

Moreover, if the servo pull-in fails two times continuously in the focus modes 0 to 3, the focus mode is switched to the mode 4 for the retry and thereby the servo pull-in can be completed successfully. In additions if the servo pull-in in the focus modes 1 to 3 fails continuously, the servo pull-in may be completed successfully by executing the search in the focus mode 4 under the condition that the operation of the focus mode 1 to 3 is executed improperly due to a certain cause. Thereby, the device's reliability of operation can be enhanced.

Various operation examples may be considered, in addition to those explained above, for the embodiment of the present invention. For examples the maximum period of search-up/search-down processes and the number of times of the failure of the servo pull-in for changing the focus mode to the mode 4 can naturally be set to the other values.

Moreover, as the processing sequencer various sequences may also be thought in addition to those shown in FIG. 6 and FIG. 7.

As explained above, in the focus servo device of the present invention, the positional condition of the objective lens in the condition that there is no focus drive signal is discriminated and the focus search operating system is set depending on the discriminated position of the objective lens. Thereby, even for the magneto-optical disc for which the true and false signals can be obtained as the focus pull-in range detecting signal (FOK signal), useless movement in the search operation can be eliminated by canceling the influence of the disc surface and a very quick focus search operation can also be realized.

In addition, since the objective lens position can be discriminated by counting the number of focus pull-in range detecting signals obtained during the period of moving the objective lens in the particular direction, accurate judgment may be done from such counted value.

Furthermore, since the position of the objective lens under the condition that there is no focus drive signal to be discriminated is set to any position among the first positional condition where the focal point of the laser beam is nearer than the recording surface of the magneto-optical disc and is farther than the surface thereof the, second positional condition where the focal point of the laser beam is nearer than the surface of the magneto-optical disc and the third positional condition where the focal point of the laser beam is further than the recording surface of the magneto-optical disc, accurate and high speed focus search operation can be set depending on each positional condition.

What is claimed is:

1. A focus servo device for use with an apparatus for reproducing or recording a signal on a disc such as an optical disc or a magneto-optical disc, with a driver mounted on an optical pickup to control a relative positional relationship between the disc and the driver, the focus servo device comprising:

drive signal generating means for generating a drive signal to forcibly move the driver in a direction from an initial position of the driver with respect to the disc, in accordance with an instruction for starting a focus search operation;

focus pull-in range detecting means for detecting that the positional relationship between the driver and the disc is within a predetermined range;

counting means for counting a focus pull-in range detecting signal obtained from the focus pull-in range detecting means during forcible movement in said direction of the driver; and discriminating means for discriminating the initial position of the driver based on the counting result of the counting means.

2. The focus servo device recited in claim 1, further comprising:

detecting means for detecting a voltage to be applied to the driver after a focus servo loop is closed, wherein said discriminating means discriminates the initial position of the driver based on the detected voltage from the detecting means and the counting result from the counting means.

3. The focus servo device according to claim 1, wherein the disc is provided with a recording layer and a protective layer and the reflectivity of the recording layer surface is approximately that of the protective layer surface.

4. The focus servo device according to claim 3, wherein the discriminating means discriminates that the initial position of the driver relative to the disc is in one of three conditions: a first condition, in which the focal point of an optical beam from the optical pickup attached to the driver is between the recording layer surface and the protective layer surface; a second condition, in which the focal point is outside of the disc: and a third condition, in which both the protective layer surface and the recording layer surface are between the optical pickup and the focal point.

5. The focus servo device recited in claim 4, wherein said direction is a first direction, the focus servo device further comprising:

second drive signal generating means for generating a second drive signal to forcibly move the driver in a second direction after detecting that the initial position of the driver is in one of three conditions, as follows: if the result of the counting means is equal to one, then the discriminating means discriminates the first condition and a focus servo loop is closed when the focus pull-in range detecting signal to be detected during the forcible movement in the second direction of the driver is obtained by the focus pull-in range detecting means; if the result of the counting means is equal to two, then the discriminating means discriminates the second condition and the focus servo loop is closed when the focus pull-in range detecting signal to be detected during the forcible movement in the second direction of the driver is obtained by the focus pull-in range detecting means; and if the result of the counting means is equal to zero, the discriminating means discriminates the third condition and the focus servo loop is closed when the focus pull-in range detecting signal to be detected during the forcible movement in the second direction of the driver is obtained by the focus pull-in range detecting means.

6. A focus servo device for use with a device for reproducing or recording a signal on a disc such as an optical disc or a magneto-optical disc, with a driver mounted on an optical pickup to control the relative positional relationship between the disc and the driver, the focus servo device comprising:

position discriminating means for discriminating a relative positional relationship between said disc and said driver under the condition that a drive signal is not applied to the driver, said position discriminating means comprising: a focus pull-in range detecting means for detecting that the positional relationship between the driver and the disc is set within the predetermined range; a counting means for counting the focus pull-in range detecting signal obtained from the focus pull-in range detecting means during forcible movement of the driver in a direction; and a discriminating means for discriminating the initial position of the driver based on the counting result in the counting means;

switching means for switching the drive signal to be applied to said driver during the focus search operation; and control means for controlling the switch of the drive signal during the focus search operation based on the discrimination result in the discriminating means.

7. A focus search method to be used with a device for reproducing or recording a signal on a disc such as an optical disc or a magneto-optical disc, with a driver mounted on an optical pickup to control the relative positional relationship between the disc and the driver, the focus search method comprising the steps of:

generating a drive signal to forcibly move the driver in a direction from an initial position of the driver with respect to the disc, in accordance with an instruction for starting a focus search;

detecting that the positional relationship between the driver and the disc is set within the predetermined range;

counting the focus pull-in range detecting signal during forcible movement in said direction of the driver; and discriminating an initial position of the driver based on a result of the step of counting.

8. The focus search method according to claim 7, further comprising the steps of:

detecting a voltage to be applied to the driver after the focus servo loop is closed; and discriminating the initial position of the driver in accordance with the result of the voltage detecting step and the counting result of the counting step.

9. The focus search method according to claim 7, wherein the disc is provided with a recording layer and a protective layer, and the reflectivity of the recording layer surface is approximately that of the protective layer surface.

10. The focus search method according to claim 7, wherein said direction is a first direction, further comprising the steps of:

generating a second drive signal to forcibly move the driver in a second direction after detecting that the initial position of the driver is in one of three conditions, as follows:

if the result of the counting step is equal to one, then discriminating a first condition and closing the focus servo loop when the focus pull-in range detecting signal to be detected during the forcible movement in the second direction of the driver is obtained;

if the result of the counting step is equal to two, then discriminating a second condition and closing the focus servo loop when the focus pull-in range detecting signal to be detected during the forcible movement in the second direction of the driver is obtained; and if the result of the counting step is equal to zero, then discriminating a third condition and closing the focus servo loop when the focus pull-in range detecting signal to be detected during the forcible movement in the second direction of the driver is obtained.

11. The focus search method according to claim 10, wherein the discriminating step discriminates that the initial position of the driver is in one of three conditions, as follows: a first condition, in which the focal point of an optical beam from the optical pickup attached to the driver is between the recording layer surface and the protective layer surface; a second condition, in which the focal point is outside of the disc; and a third condition, in which both the protective layer surface and the recording layer surface are between the optical pickup and the focal point.

* * * * *